(12) United States Patent
Insixiengmai

(10) Patent No.: US 10,385,792 B2
(45) Date of Patent: Aug. 20, 2019

(54) CONTROL DEVICE FOR INTERNAL COMBUSTION ENGINE

(71) Applicant: TOYOTA JIDOSHA KABUSHIKI KAISHA, Toyota-shi (JP)

(72) Inventor: Leuth Insixiengmai, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/813,581

(22) Filed: Nov. 15, 2017

(65) Prior Publication Data
US 2018/0238253 A1 Aug. 23, 2018

(30) Foreign Application Priority Data
Feb. 21, 2017 (JP) .................... 2017-030128

(51) Int. Cl.
| F02D 41/08 | (2006.01) |
| F02D 41/18 | (2006.01) |
| F02D 45/00 | (2006.01) |
| F02D 41/00 | (2006.01) |
| F02D 41/16 | (2006.01) |
| F02D 41/22 | (2006.01) |

(Continued)

(52) U.S. Cl.
CPC .............. *F02D 41/08* (2013.01); *F01M 13/00* (2013.01); *F01M 13/021* (2013.01); *F02D 41/0002* (2013.01); *F02D 41/16* (2013.01); *F02D 41/18* (2013.01); *F02D 41/22* (2013.01); *F02D 45/00* (2013.01); *F02D 41/0087* (2013.01); *F02D 2200/501* (2013.01); *F02D 2250/08* (2013.01); *Y02T 10/40* (2013.01)

(58) Field of Classification Search
CPC .......... F02D 41/08; F02D 41/18; F02D 45/00; F02D 41/0002; F02D 41/16
See application file for complete search history.

(56) References Cited

U.S. PATENT DOCUMENTS

| 6,568,246 | B1 * | 5/2003 | Ponagai | ................ | G01M 3/025 |
| | | | | | 73/40.5 R |
| 2003/0024496 | A1 * | 2/2003 | Tachibana | ............. | F02B 75/243 |
| | | | | | 123/184.47 |

(Continued)

FOREIGN PATENT DOCUMENTS

| JP | 8-240113 | 9/1996 |
| JP | 2004-150302 | 5/2004 |
| JP | 2011-174405 | 9/2011 |

*Primary Examiner* — Joseph J Dallo
(74) *Attorney, Agent, or Firm* — Oblon, McClelland, Maier & Neustadt, L.L.P.

(57) ABSTRACT

A control device for the internal combustion engine includes a pulsation detector, a path length calculator, and an anomaly detector. The pulsation detector detects the pulsation of the intake air flowing through the intake passage based on output signals from the air flowmeter. The path length calculator calculates the path length, which is a parameter that is correlated with the degree of the pulsation, based on the pulsation of the intake air detected by the pulsation detector. The anomaly detector determines that the fresh air passage is detached if the path length calculated by the path length calculator is less than or equal to a determination value and detects an anomaly in the fresh air passage.

6 Claims, 5 Drawing Sheets

(51) Int. Cl.
*F01M 13/00* (2006.01)
*F01M 13/02* (2006.01)

(56) References Cited

U.S. PATENT DOCUMENTS

| | | | | |
|---|---|---|---|---|
| 2003/0131833 A1* | 7/2003 | Ponagai | ............. | F02D 41/16 |
| | | | | 123/680 |
| 2011/0023852 A1* | 2/2011 | Yamashita | ............. | F01M 13/00 |
| | | | | 123/574 |
| 2015/0059719 A1* | 3/2015 | Bidner | ............. | F01M 13/028 |
| | | | | 123/574 |

* cited by examiner

Crank Angle

Air Flowmeter

Intake Pulsation

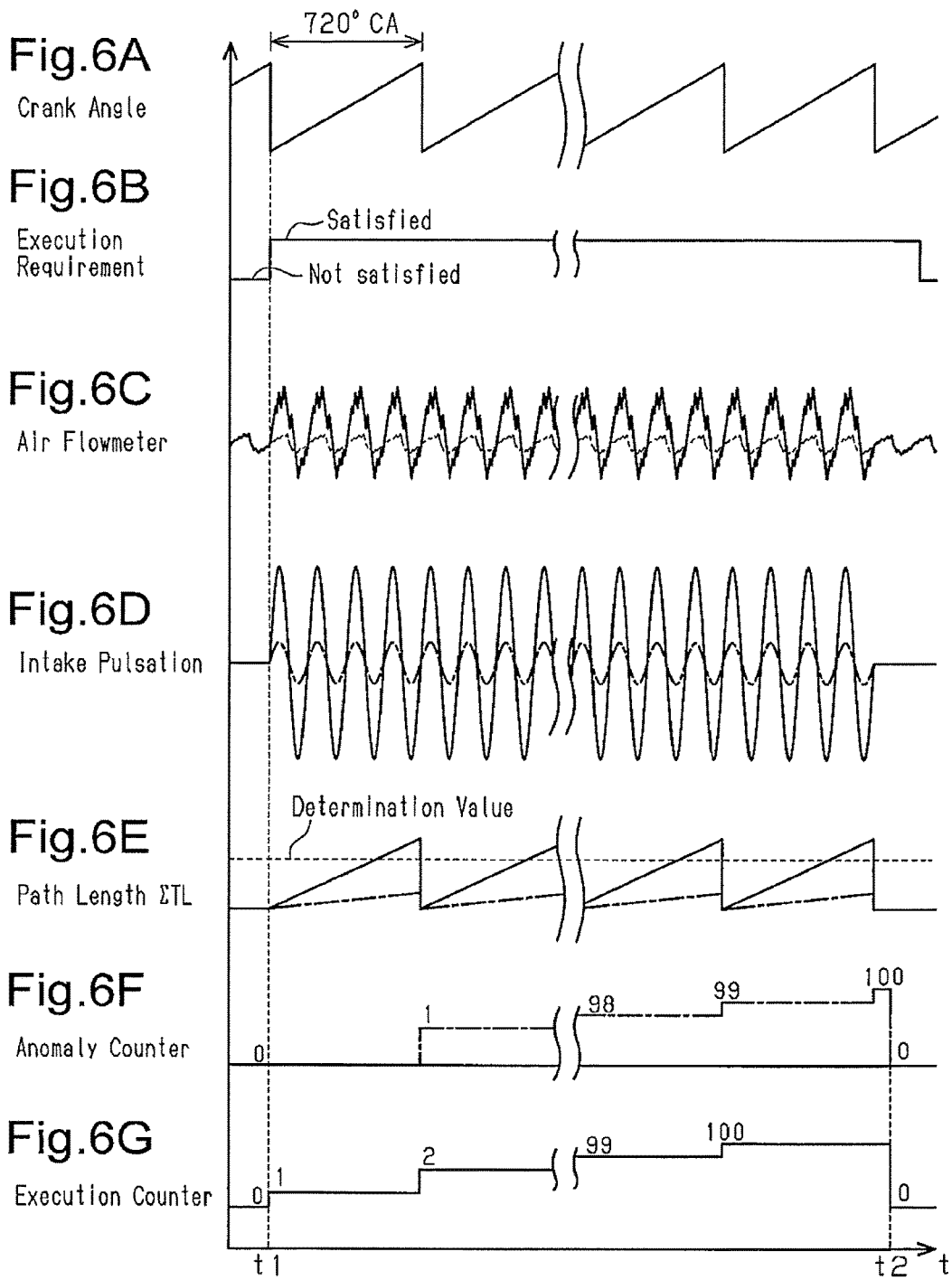

CONTROL DEVICE FOR INTERNAL COMBUSTION ENGINE

BACKGROUND OF THE INVENTION

The present invention relates to a control device for an internal combustion engine.

The internal combustion engine disclosed in Japanese Laid-Open Patent Publication No. 2004-150302 includes an intake passage coupled to coupling pipes. The coupling pipes include, for example, a positive crankcase ventilation (PCV) passage, which cause blow-by gas that is generated in a crank chamber of the internal combustion engine to flow into the intake passage. The internal combustion engine also includes an idle speed control device. The idle speed control device controls the amount of intake air introduced to combustion chambers so that the idle speed becomes equal to a target rotational speed.

The control device for an internal combustion engine disclosed in the above publication detects the coupling state between the coupling pipes and the intake passage during an idling operation of the internal combustion engine. If any of the coupling pipes is detached from the intake passage, air flows into the intake passage through a coupling port that has been opened. Thus, the rotational speed and the air-fuel ratio of the internal combustion engine are changed. The changes are reflected in the correction amount of the idle speed control device that reflects the change amount of the rotational speed of the internal combustion engine. Thus, the control device detects whether any of the coupling pipes is detached from the intake passage based on the correction amount of the idle speed control device.

Some of the internal combustion engines include, as the coupling pipes, a fresh air passage that causes fresh air to flow into the crank chamber from the intake passage in accordance with the flow of the blow-by gas through the PCV passage. In a case in which the control device disclosed in the above publication is applied to such an internal combustion engine to detect whether the fresh air passage is detached from the intake passage, the area of the coupling port between the fresh air passage and the intake passage needs to be increased so that the operating state of the internal combustion engine changes in accordance with the increase in the intake air amount due to the detachment of the fresh air passage. In this case, the design of the internal combustion engine needs to be changed.

SUMMARY OF THE INVENTION

To achieve the foregoing objective and in accordance with a first aspect of the present invention, a control device for an internal combustion engine is provided. The internal combustion engine includes an engine main body, a PCV passage, a fresh air passage, and a pulsation sensor. The PCV passage includes a first end coupled to the engine main body and a second end coupled to a section of an intake passage downstream of a throttle valve. The PCV passage causes blow-by gas to flow from a crank chamber of the engine main body to the intake passage by negative pressure in the intake passage. The fresh air passage includes a first end coupled to a section of the intake passage upstream of the throttle valve and a second end coupled to the engine main body. The fresh air passage causes fresh air to flow from the intake passage to the crank chamber in accordance with the flow of the blow-by gas. The pulsation sensor is located in the intake passage upstream of the throttle valve. The control device includes a pulsation detector, which detects pulsation of intake air flowing through the intake passage based on output signals from the pulsation sensor, a parameter calculator, which calculates a parameter that is correlated with the degree of the pulsation based on the pulsation of the intake air detected by the pulsation detector, and an anomaly detector, which determines that the fresh air passage is detached if the parameter calculated by the parameter calculator is less than or equal to a determination value, thereby detecting an anomaly in the fresh air passage.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 6A to 6G are timing diagrams illustrating the manner in which an anomaly is determined in the anomaly detection control.

DETAILED DESCRIPTION OF THE PREFERRED EMBODIMENTS

A control device for an internal combustion engine according to one embodiment will be described with reference to FIGS. 1 to 6G. In the present embodiment, the control device applied to an inline four-cylinder internal combustion engine will be described.

Figure 1:
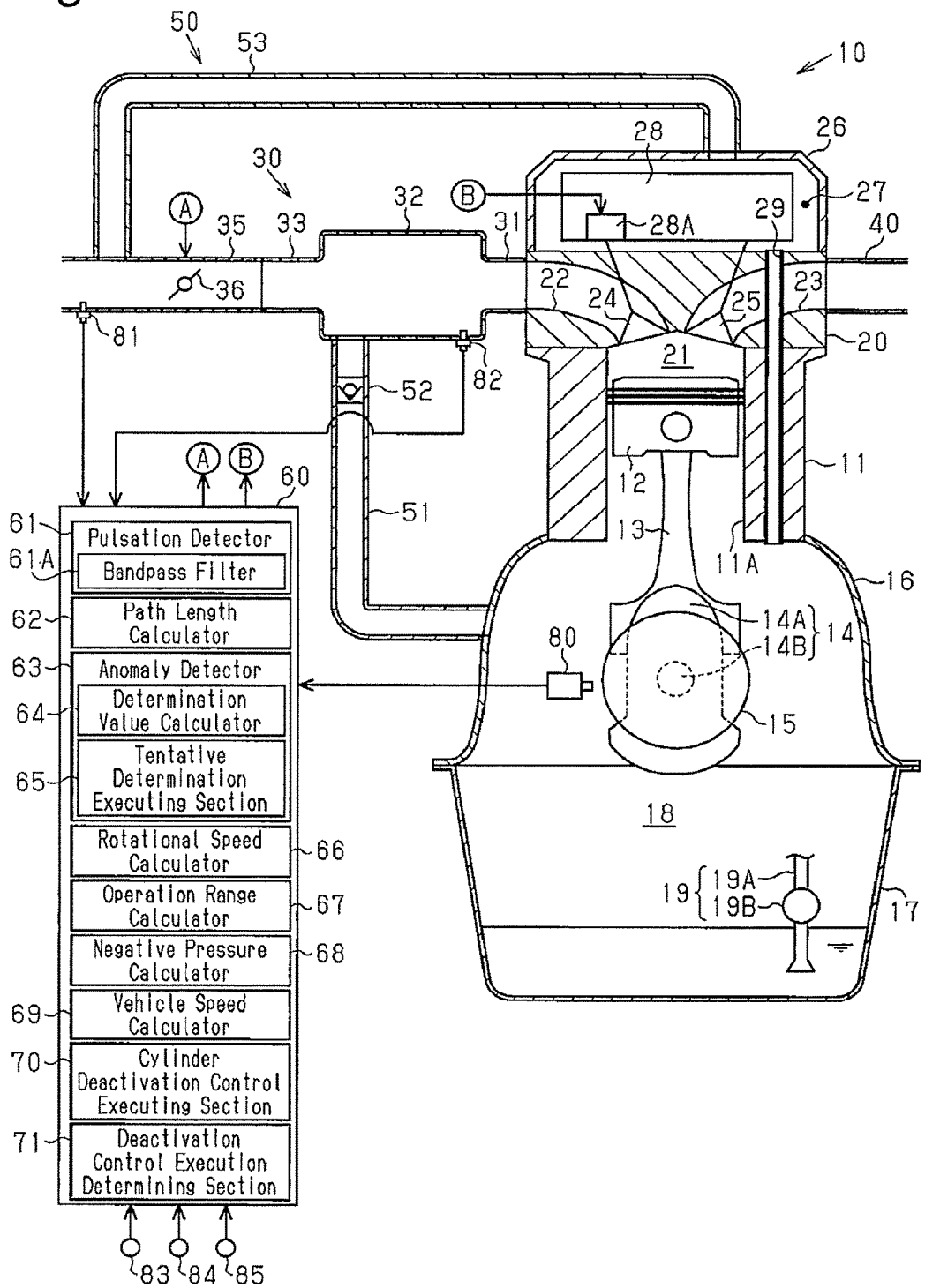
FIG. 1 is a schematic diagram illustrating the configuration of a control device for an internal combustion engine according to one embodiment.

As illustrated in FIG. 1, an engine main body 10 of the internal combustion engine mounted on a vehicle includes a cylinder block 11. The cylinder block 11 includes four cylinders 11A. The four cylinders 11A are arranged in a predetermined direction (the direction perpendicular to the sheet of FIG. 1). Each of the cylinders 11A slidably accommodates a piston 12. Each piston 12 is coupled to one end of a connecting rod 13. The other end of the connecting rod 13 is coupled to the output shaft of the internal combustion engine. The output shaft is a crankshaft 14. The crankshaft 14 includes an arm portion 14A and a shaft portion 14B. The connecting rods 13 are coupled to the arm portion 14A. The arm portion 14A is secured to the shaft portion 14B. One end of the crankshaft 14 is coupled to a disk-shaped timing rotor 15. The disk-shaped timing rotor 15 rotates integrally with the shaft portion 14B. The outer circumferential surface of the timing rotor 15 includes non-illustrated teeth. The teeth are projections and depressions and are arranged in the circumferential direction of the timing rotor 15. The internal combustion engine includes a crank angle sensor 80. The crank angle sensor 80 faces the outer circumferential surface of the timing rotor 15. The crank angle sensor 80 outputs electrical signals in response to the passing of the teeth on the outer circumferential surface of the timing rotor 15.

The lower end of the cylinder block 11 is attached to a crankcase 16. The crankcase 16 is formed into a shape such that the width of the crankcase 16 increases toward the lower end. The lower end of the crankcase 16 is attached to an oil pan 17, which stores oil. The cylinder block 11, the crankcase 16, and the oil pan 17 configure a crank chamber 18. The crank chamber 18 accommodates the crankshaft 14.

The internal combustion engine also includes an oil supply system 19. The oil supply system 19 supplies oil stored in the oil pan 17 to various parts of the internal combustion engine. The oil supply system 19 includes an oil supply passage 19A and an oil pump 19B. The oil supply passage 19A is provided in the oil pan 17. The oil pump 19B is located in the oil supply passage 19A. The oil pump 19B is, for example, an engine driven pump. The oil pump 19B pumps oil stored in the oil pan 17 into the oil supply passage 19A in accordance with the rotation of the crankshaft 14. The end of the oil supply passage 19A farther from the oil pan 17 branches into multiple passages and extends to various parts of the engine main body 10. The oil is supplied to various parts of the engine main body 10 through the oil supply passage 19A.

The upper end of the cylinder block 11 is coupled to a cylinder head 20. The cylinders 11A, the pistons 12, and the cylinder head 20 configure combustion chambers 21. The cylinder head 20 includes intake ports 22 and exhaust ports 23. The intake ports 22 and the exhaust ports 23 communicate with the combustion chambers 21. Each intake port 22 is provided with an intake valve 24. Each exhaust port 23 is provided with an exhaust valve 25.

The upper end portion of the cylinder head 20 is attached to a cylinder head cover 26. The cylinder head 20 and the cylinder head cover 26 configure an accommodation chamber 27. The accommodation chamber 27 accommodates a valve mechanism 28. The valve mechanism 28 drivingly opens and closes the intake valves 24 and the exhaust valves 25. The valve mechanism 28 also includes a deactivating device 28A. The deactivating device 28A suspends opening and closing operation of some of the intake valves 24, which are located corresponding to the cylinders 11A. Oil is supplied to the valve mechanism 28 through the oil supply system 19. The accommodation chamber 27 communicates with the crank chamber 18 via an oil return passage 29. The oil return passage 29 extends through the cylinder head 20 and the cylinder block 11. The oil that has lubricated the valve mechanism 28 is discharged to the crank chamber 18 through the oil return passage 29.

The engine main body 10 includes the cylinder block 11, the crankcase 16, the oil pan 17, the cylinder head 20, and the cylinder head cover 26. The engine main body 10 is coupled to an intake manifold 30. The intake manifold 30 communicates with the intake ports 22. The intake manifold 30 includes a downstream section 31, a surge tank 32, and an upstream section 33. The downstream section 31 is coupled to the intake ports 22. The surge tank 32 is coupled to the downstream section 31. The upstream section 33 is coupled to the surge tank 32. The cross-sectional area of the flow passage of the surge tank 32 is greater than the cross-sectional area of the flow passage of the downstream section 31 and the upstream section 33. The upstream section 33 of the intake manifold 30 is coupled to an intake pipe 35. The intake pipe 35 is provided with a throttle valve 36. The throttle valve 36 regulates the amount of intake air introduced into the combustion chambers 21. An air flowmeter 81 is provided in a section of the intake pipe 35 upstream of the throttle valve 36. The air flowmeter 81 detects the flow rate of the intake air that flows through the intake pipe 35. The intake manifold 30 is provided downstream of the throttle valve 36. The negative pressure in the intake manifold 30 changes in accordance with the opening degree of the throttle valve 36. The surge tank 32 is provided with a negative pressure sensor 82. The negative pressure sensor 82 detects the negative pressure in the intake manifold 30. The intake ports 22, the intake manifold 30, and the intake pipe 35 configure an intake passage, which introduces intake air to the combustion chambers 21. When the valve mechanism 28 opens each intake valve 24 while the corresponding piston 12 of the engine main body 10 is lowered, the intake air flows into the associated combustion chamber 21 through the intake passage. When the valve mechanism 28 closes each intake valve 24, the flow of the intake air into the associated combustion chamber 21 through the intake passage stops. Repetitive allowing and stopping of flow of intake air into the combustion chambers 21 of the cylinders 11A causes pulsation of the negative pressure in the intake manifold 30, which is located in the intake passage downstream of the throttle valve 36.

The engine main body 10 is also coupled to an exhaust manifold 40. The exhaust manifold 40 communicates with the exhaust ports 23. The exhaust ports 23 and the exhaust manifold 40 configure an exhaust passage, which discharges exhaust gas from the combustion chambers 21.

In the internal combustion engine, gas may leak from the combustion chambers 21 to the crank chamber 18 through a gap between each piston 12 and the corresponding cylinder 11A. The gas that has leaked from the combustion chambers 21 to the crank chamber 18 is referred to as blow-by gas. The internal combustion engine is provided with a PCV device 50. The PCV device 50 discharges the blow-by gas from the crank chamber 18 to flow into the intake passage.

The PCV device 50 includes a PCV passage 51. A first end of the PCV passage 51 is coupled to the crankcase 16. A second end of the PCV passage 51 is coupled to the surge tank 32 of the intake manifold 30. The surge tank 32 is located downstream of the throttle valve 36. A PCV valve 52 is provided in the path of the PCV passage 51. The PCV valve 52 is a mechanical check valve that is opened and closed in accordance with the pressure in the PCV passage 51 near the crank chamber 18 and the pressure in the PCV passage 51 near the intake manifold 30. That is, the PCV valve 52 is opened when the pressure difference obtained by subtracting the pressure Pm in the PCV passage 51 near the intake manifold 30 from the pressure Pc in the PCV passage 51 near the crank chamber 18 is greater than or equal to a predetermined pressure Pk (Pc≥Pm+Pk), so that the flow of gas from the crank chamber 18 to the intake manifold 30 is permitted. The PCV valve 52 is closed when the pressure difference obtained by subtracting the pressure Pm near the intake manifold 30 from the pressure Pc near the crank chamber 18 is less than the above-mentioned predetermined pressure Pk (Pc<Pm+Pk), so that the flow of gas from the intake manifold 30 to the crank chamber 18 is restricted.

The PCV device 50 also includes a fresh air passage 53. A first end of the fresh air passage 53 is coupled to part of the intake pipe 35 upstream of the throttle valve 36. A second end of the fresh air passage 53 is coupled to the cylinder head cover 26. The first end of the fresh air passage 53 is coupled to a section of the intake pipe 35 between the throttle valve 36 and the air flowmeter 81.

Negative pressure is generated in the intake manifold 30 in accordance with the operation of the internal combustion engine. The negative pressure is then supplied to the PCV passage 51 of the PCV device 50. Thus, the pressure Pm in the PCV passage 51 near the intake manifold 30 is decreased, so that the PCV valve 52 is opened. This causes the blow-by gas to flow from the crank chamber 18 to the intake manifold 30. As the blow-by gas flows, the negative pressure is also supplied to the inside of the crank chamber 18. At this time, the fresh air flows from the intake pipe 35 to the crankcase 16 through the fresh air passage 53. That is, the fresh air that has flowed from the intake pipe 35 to the accommodation chamber 27 of the cylinder head cover 26 through the fresh air passage 53 flows to the crank chamber 18 through the oil return passage 29. As described above, the PCV passage 51 is a passage for causing the blow-by gas to flow from the crank chamber 18 to the intake passage by the negative pressure in the intake passage. The fresh air passage 53 is a passage for causing the fresh air to flow from the intake passage to the crank chamber 18 in accordance with the flow of the blow-by gas. As described above, pulsation occurs in the negative pressure generated in the intake passage in accordance with the operation of the internal combustion engine. The pulsation causes pulsation also in the flow of the blow-by gas and the fresh air. The fresh air that flows through the fresh air passage 53 flows in from the section of the intake passage upstream of the throttle valve 36. Thus, the pulsation of the intake air occurs in the section of the intake passage upstream of the throttle valve 36 due to the flow of the blow-by gas and the fresh air.

A control device 60 for the internal combustion engine receives output signals from the crank angle sensor 80, the air flowmeter 81, and the negative pressure sensor 82. The control device 60 also receives output signals of a gas pedal sensor 83, which detects the depression amount of the gas pedal, a vehicle speed sensor 84, which detects the vehicle speed, and an ignition switch 85. The control device 60 controls the opening degree of the throttle valve 36 based on the output signals from the crank angle sensor 80, the gas pedal sensor 83, and other sensors. The control device 60 includes, as functioning sections, a pulsation detector 61, a path length calculator 62, an anomaly detector 63, a rotational speed calculator 66, an operation range calculator 67, a negative pressure calculator 68, a vehicle speed calculator 69, a cylinder deactivation control executing section 70, and a deactivation control execution determining section 71. The control device 60 executes anomaly detection control for detecting an anomaly in the fresh air passage 53, that is, whether the fresh air passage 53 is detached from the cylinder head cover 26 or the intake pipe 35.

The pulsation detector 61 detects pulsation of the intake air in the intake passage caused by the flow of the blow-by gas and the fresh air based on the output signals from the air flowmeter 81. The air flowmeter 81 functions as a pulsation sensor. The pulsation detector 61 includes a bandpass filter 61A. The bandpass filter 61A passes, among the output signals from the air flowmeter 81, an output signal in the frequency range that corresponds to the pulsation of the negative pressure generated in the section of the intake passage downstream of the throttle valve 36. The bandpass filter 61A changes the frequency range of the output signal to be passed among the output signals from the air flowmeter 81 in accordance with the operating state of the internal combustion engine detected by an operating state detector, which will be discussed below.

The path length calculator 62 calculates, based on the pulsation of the intake air detected by the pulsation detector 61, the path length $\Sigma TL$ during one cycle of the intake pulsation, which is a parameter that is correlated with the degree of the pulsation. As used herein, one cycle refers to 720° CA of the crank angle. The path length calculator 62 corresponds to a parameter calculator.

The anomaly detector 63 detects an anomaly in the fresh air passage 53. The anomaly detector 63 determines that the fresh air passage 53 is detached from at least one of the cylinder head cover 26 and the intake pipe 35 when the path length $\Sigma TL$ of the pulsation calculated by the path length calculator 62 is less than or equal to a determination value. The anomaly detector 63 includes a determination value calculator 64 and a tentative determination executing section 65. The determination value calculator 64 calculates the determination value used in performing anomaly detection. The tentative determination executing section 65 compares the path length $\Sigma TL$ of the pulsation calculated by the path length calculator 62 with the determination value calculated by the determination value calculator 64 to make a tentative determination of the occurrence of an anomaly.

The rotational speed calculator 66 calculates the rotational speed of the crankshaft 14 based on the output signals from the crank angle sensor 80. The operation range calculator 67 calculates the operation range of the internal combustion engine based on the rotational speed calculated by the rotational speed calculator 66 and the output signals from the gas pedal sensor 83. The operation range includes operation ranges such as an idling operation range.

The negative pressure calculator 68 calculates the negative pressure in the surge tank 32 based on the output signals from the negative pressure sensor 82. The negative pressure sensor 82 and the negative pressure calculator 68 correspond to a negative pressure detector. The vehicle speed calculator 69 calculates the vehicle speed based on the output signals from the vehicle speed sensor 84. The vehicle speed sensor 84 and the vehicle speed calculator 69 configure a traveling state detector, which detects the traveling state of the vehicle.

The cylinder deactivation control executing section 70 executes cylinder deactivation control. The cylinder deactivation control executing section 70 drives the deactivating device 28A of the valve mechanism 28 when a predetermined execution requirement is satisfied and suspends opening and closing operation of some of the intake valves 24, which are arranged to correspond to the cylinders 11A. In the present embodiment, the opening and closing operation of the intake valve 24 that is arranged to correspond to one of four cylinders 11A of the internal combustion engine is suspended, and three cylinders 11A of the internal combustion engine are operated. Thus, the internal combustion engine virtually includes three cylinders 11A. The cylinder deactivation control reduces the pumping loss and improves the fuel efficiency.

The deactivation control execution determining section 71 determines whether the cylinder deactivation control is being executed by the cylinder deactivation control executing section 70. In the present embodiment, the rotational speed calculator 66, the operation range calculator 67, the deactivation control execution determining section 71, the crank angle sensor 80, and the gas pedal sensor 83 configure the operating state detector.

Next, the series of steps involved in the anomaly detection control executed by the control device 60 for the internal combustion engine will be described with reference to the flowchart of FIG. 2. The anomaly detection control is repeatedly executed at each predetermined cycle (for example, 720° CA).

Figure 2:
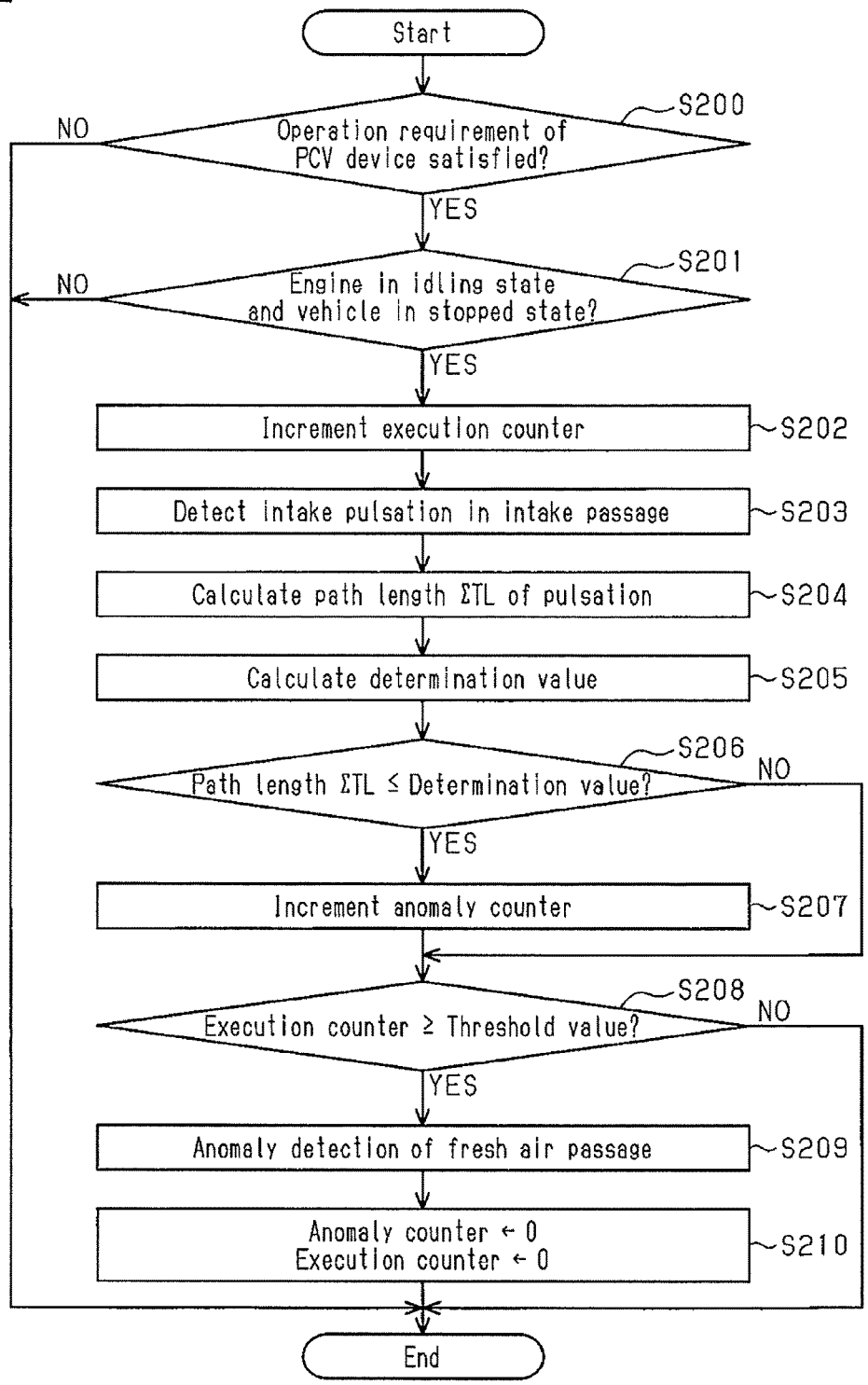
FIG. 2 is a flowchart illustrating a series of steps of an anomaly detection control executed by the control device for an internal combustion engine.

As illustrated in FIG. 2, the control device 60 first determines whether the operation requirement of the PCV device 50 is satisfied (step S200). In this process, the control device 60 determines that the operation requirement of the PCV device 50 is satisfied when the negative pressure in the surge tank 32 is greater than a predetermined value. The predetermined value is set to the lower limit value of the negative pressure when the PCV valve 52 is opened. If the operation requirement of the PCV device 50 is satisfied (step S200: YES), the control device 60 determines whether the operating state of the internal combustion engine is an idling operation and the vehicle is in a stopped state (step S201). In this process, the decision outcome of the control device 60 is positive if the operation range of the internal combustion engine calculated by the operation range calculator 67 is the idling operation range, the vehicle speed calculated by the vehicle speed calculator 69 is zero, and the ignition switch 85 is ON.

In the process of step S201, if it is determined that the internal combustion engine is in an idling operation and the vehicle is in a stopped state (step S201: YES), the control device 60 proceeds to the process of step S202 and starts the anomaly detection control. In the process of step S202, the control device 60 increments an execution counter and counts the number of times the anomaly detection control has been executed. Subsequently, the pulsation detector 61 detects the pulsation of the intake air in the section of the intake passage upstream of the throttle valve 36 (step S203). In this process, the pulsation detector 61 receives the output signals of the air flowmeter 81.

Figure 3A:
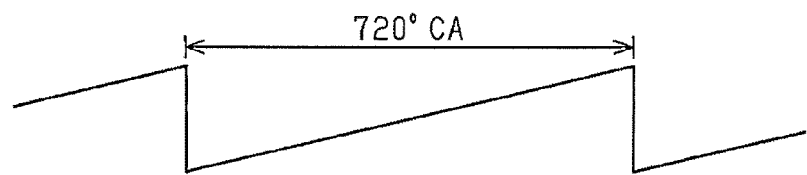
FIGS. 3A to 3C are timing diagrams schematically illustrating changes in the crank angle and the pulsation of the intake air that occurs in the intake passage.
Figure 3B:
Figure 3C:
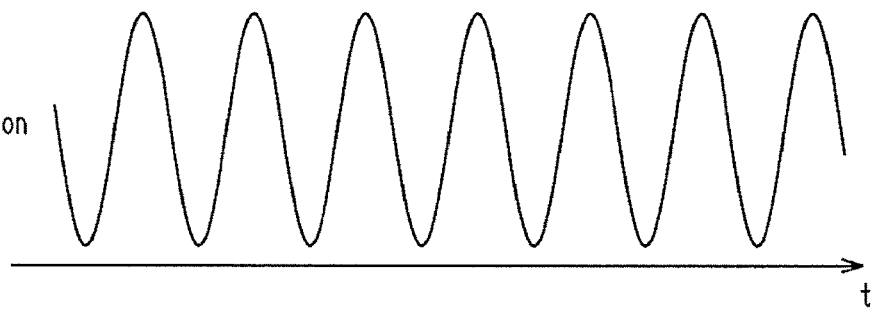

As illustrated in FIG. 3A, the control device 60 for the internal combustion engine detects the crank angle of the internal combustion engine based on the output signals from the crank angle sensor 80. When the PCV device 50 is operated, pulsation of the intake air occurs in the section of the intake passage upstream of the throttle valve 36 due to the flow of the blow-by gas and the fresh air. As illustrated in FIG. 3B, fluctuation in the flow rate of intake air caused by the pulsation is reflected in the output signals of the air flowmeter 81, which is located in the intake pipe 35 upstream of the throttle valve 36. The air flowmeter 81 outputs, for example, a voltage signal at each predetermined time period (for example, 4 ms) as the output signal corresponding to the flow rate of the intake air. The pulsation detector 61 receives the output signals from the air flowmeter 81. Upon reception of the output signals from the air flowmeter 81, the bandpass filter 61A extracts the output signal in the frequency range that corresponds to the pulsation of the negative pressure generated in the section of the intake passage downstream of the throttle valve 36. The frequency of the pulsation of the negative pressure generated in the section of the intake passage downstream of the throttle valve 36 is influenced by the rotational speed of the internal combustion engine and the number of the cylinders 11A that are in operation. That is, the faster the rotational speed of the internal combustion engine and the greater the number of the cylinders 11A in operation, the higher becomes the pulsation frequency of the negative pressure. Thus, the bandpass filter 61A changes the frequency range to be passed in accordance with the operating state of the internal combustion engine detected by the operating state detector, that is, the rotational speed of the internal combustion engine calculated by the rotational speed calculator 66 and whether the cylinder deactivation control has been executed that is determined by the deactivation control execution determining section 71. As illustrated in FIG. 3C, the pulsation detector 61 detects the pulsation of the intake air in the intake passage. The pulsation detector 61 amplifies the signal extracted by the bandpass filter 61A and increases its dynamic range. FIGS. 3B and 3C illustrate the pulsation of the intake air when the cylinder deactivation control is not being executed. In this case, since the intake valves 24 are drivingly opened and closed in all the four operated cylinders 11A during 720° CA of crankshaft rotation, the intake air flows into the combustion chambers 21 four times. Thus, the intake pulsation in the intake passage causes four peaks and four valleys per 720° CA.

Subsequently, the control device 60 proceeds to the process in step S204 of FIG. 2 and calculates the path length $\Sigma TL$ of the pulsation per 720° CA by the path length calculator 62 based on the pulsation of the intake air detected by the pulsation detector 61.

Figure 4:
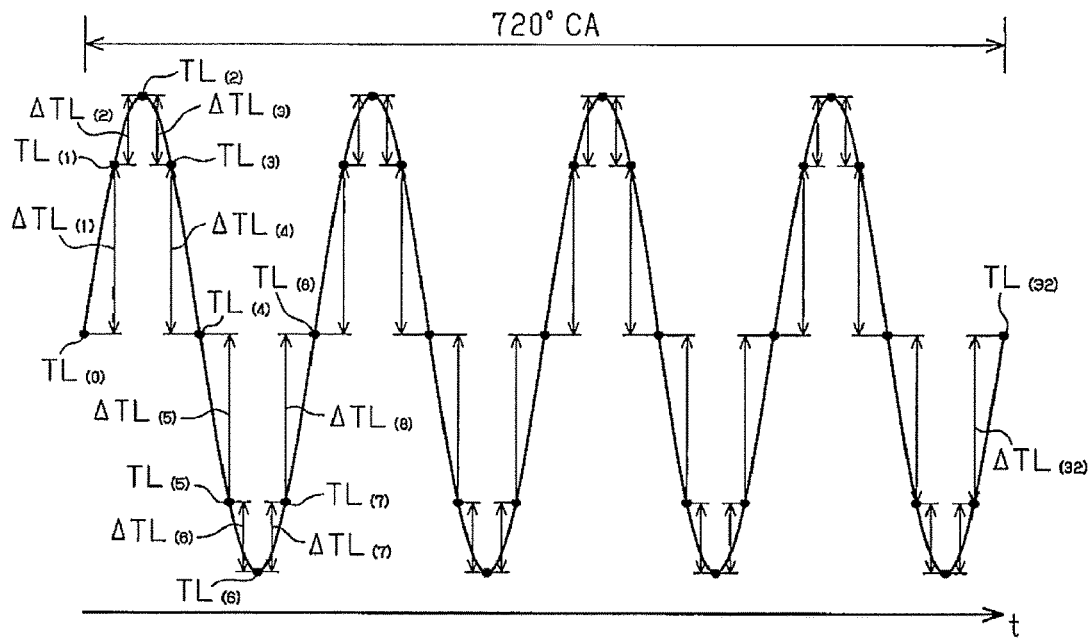
FIG. 4 is a timing diagram schematically illustrating the manner in which the path length of the pulsation of the intake air is calculated.

As illustrated in FIG. 4, the path length calculator 62 calculates an absolute value $\Delta TL_{(n)}$ ($\Delta TL_{(n)} > 0$) of the difference between a previous value $TL_{(n-1)}$ and a current value $TL_{(n)}$ of the pulsation of the intake air, which are values corresponding to the signals obtained from the air flowmeter 81. The path length calculator 62 integrates the absolute value $\Delta TL_{(n)}$ for 720° CA to calculate the path length $\Sigma TL$ ($\Sigma TL = \Delta TL_{(1)} + TL_{(2)} + \ldots + \Delta TL_{(32)}$). As described above, the air flowmeter 81 outputs the output signal corresponding to the flow rate of the intake air at each predetermined time period. Thus, the path length calculator 62 integrates the absolute value $\Delta TL$ calculated at the above-mentioned each predetermined time period from when the crank angle is 0° CA until the crank angle reaches 720° CA to calculate the path length $\Sigma TL$. The path length $\Sigma TL$ is correlated with the degree of the pulsation of the intake air in the intake passage. Thus, the greater the pulsation, the greater becomes the path length $\Sigma TL$.

After calculating the path length $\Sigma TL$, the control device 60 proceeds to the process of step S205 in FIG. 2. In this process, the determination value calculator 64 calculates the determination value used when the anomaly determination is performed. If an anomaly occurs due to detaching of the fresh air passage 53 from the cylinder head cover 26 or the intake pipe 35, the pulsation of the blow-by gas and the fresh air is not transmitted to the intake pipe 35. Thus, the pulsation of the intake air caused by the pulsation of the blow-by gas or the fresh air is unlikely to occur in the section of the intake passage upstream of the throttle valve 36. For this reason, the path length $\Sigma TL$ of the intake pulsation in the intake passage is reduced. The determination value is previously obtained by, for example, experiments and is stored in the control device 60 as a map. The determination value is set to a value that is less than the path length $\Sigma TL$ of the intake pulsation when the fresh air passage 53 is coupled to the engine main body 10 and the intake passage and is in a normal state and that is greater than the path length $\Sigma TL$ of the intake pulsation when an anomaly occurs in the fresh air passage 53.

Figure 5:
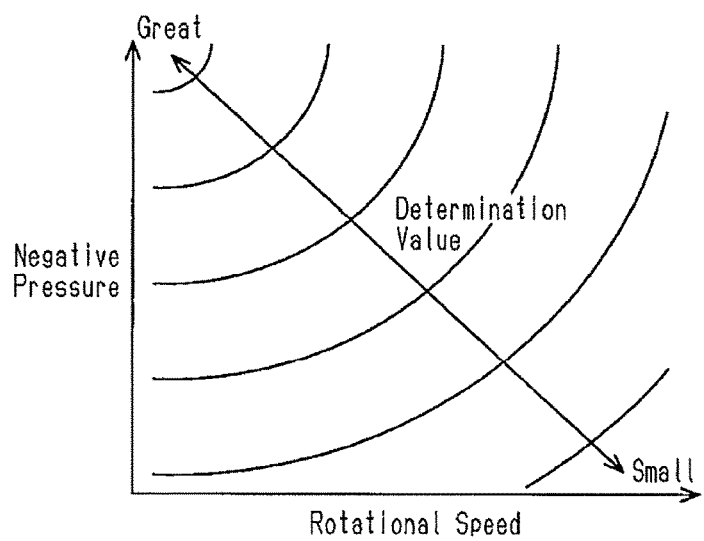
FIG. 5 is a map illustrating the relationship between the rotational speed of the internal combustion engine, the negative pressure, and the determination value.

As illustrated in FIG. 5, the determination value is set in accordance with the rotational speed of the internal combustion engine and the negative pressure of the intake passage. When the rotational speed of the internal combustion engine is low, the opening degree of the throttle valve 36 is small, and the negative pressure generated in the section of the intake passage downstream of the throttle valve 36 is increased. When the negative pressure is great, the flow rate of the blow-by gas and the fresh air when the intake valves 24 are opened is great. This increases the difference between the flow rate of the blow-by gas and the fresh air when the intake valves 24 are opened and the flow rate of the blow-by gas and the fresh air when the intake valves 24 are closed, which in turn increases the pulsations of the blow-by gas and the fresh air. Thus, the lower the rotational speed of the internal combustion engine, the greater becomes the intake pulsation in the intake passage caused by the flow of the blow-by gas and the fresh air. When the negative pressure generated in the section of the intake passage downstream of the throttle valve is great, the intake pulsation in the intake passage caused by the flow of the blow-by gas and the fresh air is increased. Thus, the lower the rotational speed of the internal combustion engine and the greater the above-mentioned negative pressure, the greater becomes the difference between the path length ΣTL of the intake pulsation in the intake passage during the normal state, in which the fresh air passage 53 is coupled, and the path length ΣTL of the intake pulsation in the intake passage during an anomalous state in which the fresh air passage 53 is detached.

Thus, as illustrated in FIG. 5, the determination value is set in such a manner that the lower the rotational speed of the internal combustion engine, the greater becomes the determination value, and that the greater the negative pressure in the section of the intake passage downstream of the throttle valve 36, the greater becomes the determination value.

In this manner, when the determination value is set in the process of step S205 of FIG. 2, the control device 60 proceeds to the process of step S206 and determines whether the path length ΣTL of the intake pulsation is less than or equal to the determination value by the tentative determination executing section 65. In this process, if it is determined that the path length ΣTL of the intake pulsation is less than or equal to the determination value (step S206: YES), the control device 60 proceeds to the process of step S207 and increments an anomaly counter by the anomaly detector 63. The anomaly counter is a counter that indicates the number of times it has been tentatively determined that the fresh air passage 53 is detached from at least one of the cylinder head cover 26 and the intake pipe 35. Subsequently, the control device 60 proceeds to the process of step S208.

In the process of step S206, if it is determined that the path length ΣTL of the intake pulsation exceeds the determination value (step S206: NO), the control device 60 proceeds to the process of step S208 without incrementing the anomaly counter.

In the process of step S208, the control device 60 determines whether the execution counter is greater than or equal to a threshold value. The threshold value is set to, for example, 100. If the execution counter reaches the threshold value (step S208: YES), the anomaly detector 63 performs anomaly detection of the fresh air passage 53 (step S209). In this process, it is determined whether the ratio R of the number of times the fresh air passage 53 has been tentatively determined as being anomalous relative to the number of times the anomaly detection control has been executed (anomaly counter/execution counter×100) is greater than or equal to an anomalous ratio (for example, 90%). If the ratio R is greater than or equal to the anomalous ratio, the anomaly detector 63 determines that an anomaly has occurred in the fresh air passage 53. Subsequently, the control device 60 proceeds to the process of step S210, resets the execution counter and the anomaly counter, and ends the series of steps involved in the anomaly detection control.

In the process of step S208, if the execution counter has not reached the threshold value (step S208: NO), the control device 60 ends the series of steps involved in the anomaly detection control without executing the following processes. Thus, the anomaly counter is maintained until the execution counter reaches the threshold value. Additionally, the number of times it is tentatively determined that there is an anomaly in the fresh air passage 53 is counted each time the anomaly detection control is executed.

If it is determined that the operation requirement of the PCV device 50 is not satisfied (step S200: NO), if it is determined that the internal combustion engine is not in an idling operation, and if it is determined that the vehicle is not in a stopped state (step S201: NO), the control device 60 ends the series of steps involved in the anomaly detection control without performing the following processes.

Next, the manner in which an anomaly is determined by the anomaly detection control is described with reference to the timing diagrams in FIGS. 6A to 6G.

As illustrated in FIG. 6A, the control device 60 for the internal combustion engine calculates the crank angle as the internal combustion engine is operated. The control device 60 for the internal combustion engine determines that an execution requirement for the anomaly detection control has been satisfied at the point in time t1, at which the operation requirement of the PCV device 50 is satisfied, the internal combustion engine is in an idling operation, and the vehicle is in a stopped state, and starts the control. In this example, as illustrated in FIG. 6B, the point in time at which the crank angle is 0° coincides with the point in time t1.

As illustrated by the solid line in FIG. 6C, the air flowmeter 81 detects the flow rate of the intake air in the section of the intake passage upstream of the throttle valve 36. The control device 60 receives the output signal from the air flowmeter 81 at each predetermined time period. When the fresh air passage 53 is in the normal state, at the point in time t1, at which the operation requirement of the PCV device 50 is satisfied, the intake pulsation occurs due to the flow of the blow-by gas and the fresh air. Thus, the fluctuation of the output signals from the air flowmeter 81 is great. As illustrated by the long dashed short dashed line in FIG. 6C, if there is an anomaly in the fresh air passage 53, the intake pulsation due to the flow of the blow-by gas and the fresh air does not occur. Thus, the fluctuation of the output signals from the air flowmeter 81 is small. In this case also, the pulsation of the negative pressure in the section of the intake passage downstream of the throttle valve 36 is slightly transmitted to the section upstream of the throttle valve 36. Thus, even before the operation requirement of the PCV device 50 is satisfied (before the point in time t1), the output signals of the air flowmeter 81 slightly fluctuate.

When the anomaly detection control is started, the execution counter is incremented as illustrated in FIG. 6G. As illustrated in FIG. 6D, the intake pulsation in the intake passage is detected based on the output signals of the air flowmeter 81 by the pulsation detector 61. The output signals from the air flowmeter 81 reflect, for example, the influence of the noise and the disturbance in the air flowmeter 81, in addition to the influence of the pulsation in the intake air. Thus, the pulsation detector 61 processes the output signals from the air flowmeter 81 with the bandpass filter 61A and extracts, among the output signals from the air flowmeter 81, the output signal that corresponds to the frequency of the pulsation of the negative pressure generated in the section of the intake passage downstream of the throttle valve 36. The bandpass filter 61A changes the frequency range of the signal to be passed among the output signals from the air flowmeter 81 in accordance with the operating state of the internal combustion engine. The pulsation detector 61 then detects the pulsation of the intake air in the section of the intake passage upstream of the throttle valve 36. In this process, if the fresh air passage 53 is in the normal state, the detected intake pulsation is great as illustrated by the solid line in FIG. 6D, and if an anomaly occurs in the fresh air passage 53, the detected intake pulsation is small as illustrated by the long dashed short dashed line in FIG. 6D.

Thus, as illustrated by the solid line in FIG. 6E, the path length ΣTL of the intake pulsation when the fresh air passage 53 is in the normal state is increased greatly per 720° CA and exceeds the determination value. As illustrated by the long dashed short dashed line in FIG. 6E, the path length ΣTL of the intake pulsation when an anomaly has occurred in the fresh air passage 53 does not significantly increase per 720° CA and is less than or equal to the determination value. Thus, if the fresh air passage 53 is in the normal state, the anomaly counter is not incremented as illustrated by the solid line in FIG. 6F. If an anomaly occurs in the fresh air passage 53, the anomaly counter is incremented as illustrated by the long dashed short dashed line in FIG. 6F. Subsequently, since the anomaly detection control is executed at each predetermined cycle, the execution counter is increased. The anomaly determination is performed by the anomaly detection control when the execution counter reaches the threshold value, which is 100. The anomaly detection control detects whether there is an anomaly in the fresh air passage 53. If the anomaly detector 63 detects an anomaly, the anomaly detector 63 stores the anomaly of the fresh air passage 53. Thus, an operator is allowed to find that there is an anomaly through access to the anomaly detector 63 during maintenance. Subsequently, the anomaly counter and the execution counter are reset at the point in time t2 as illustrated in FIGS. 6F and 6G.

The present embodiment has the following advantages.

(1) During the operation of the internal combustion engine, pulsation occurs in the blow-by gas and the fresh air that flow through the PCV passage 51 and the fresh air passage 53 due to the pulsation of the negative pressure generated in the intake passage. During the normal state, in which the fresh air passage 53 is coupled to the cylinder head cover 26 and the intake pipe 35, the pulsation of the blow-by gas and the fresh air is transmitted. Thus, the pulsation of the intake air occurs in the section of the intake passage upstream of the throttle valve 36. If the fresh air passage 53 is detached from at least one of the cylinder head cover 26 and the intake pipe 35, and the fresh air passage 53 is in an anomalous state, the pulsation of the blow-by gas and the fresh air is not transmitted to the intake passage. Thus, the pulsation of the intake air caused by the pulsation of the blow-by gas and the fresh air is not likely to occur in the section of the intake passage upstream of the throttle valve 36. In the present embodiment, the pulsation of the intake air that flows through the intake passage is detected based on the output signals from the air flowmeter 81. Upon detection of the pulsation, the path length ΣTL of the pulsation, which is correlated with the degree of the pulsation of the intake air, is calculated. If the path length ΣTL is less than or equal to the determination value, the anomaly detector 63 determines that the fresh air passage 53 is detached from at least one of the cylinder head cover 26 and the intake pipe 35. Such a configuration can take any form as long as the pulsation of the fresh air is transmitted to the intake passage. Thus, unlike the above-mentioned conventional device, the size of the coupling port between the fresh air passage 53 and the intake passage does not necessarily have to be increased to such a size that causes the operating state of the internal combustion engine to be changed when the fresh air passage 53 is detached. Thus, the occurrence of an anomaly in the fresh air passage 53 is detected while minimizing the design change in the internal combustion engine.

(2) The lower the rotational speed of the internal combustion engine, the smaller becomes the opening degree of the throttle valve 36. Thus, the negative pressure generated in the section of the intake passage downstream of the throttle valve 36 tends to increase. When the blow-by gas and the fresh air flow under the great negative pressure, the pulsation of the blow-by gas and the fresh air is likely to be increased. Thus, the lower the rotational speed of the internal combustion engine, the greater becomes the pulsation of the intake air caused by the flow of the blow-by gas and the fresh air. Thus, the lower the rotational speed of the internal combustion engine, the greater becomes the difference between the degree of the intake pulsation in the intake passage during the normal state, in which the fresh air passage 53 is coupled, and the degree of the intake pulsation in the intake passage during an anomalous state, in which the fresh air passage 53 is detached. In the present embodiment, the lower the rotational speed of the internal combustion engine, the greater the determination value used for the anomaly determination is set. This reduces erroneous determination in the anomaly determination and increases the accuracy in detecting the occurrence of an anomaly.

(3) The greater the negative pressure generated in the section of the intake passage downstream of the throttle valve 36, the more likely that the pulsation of the blow-by gas and the fresh air is increased when they flow. Thus, the greater the negative pressure generated in the intake passage, the greater becomes the pulsation of the intake air caused by the flow of the blow-by gas and the fresh air. Thus, the greater the negative pressure in the intake passage, the greater becomes the difference between the degree of the intake pulsation in the intake passage during the normal state, in which the fresh air passage 53 is coupled, and the degree of the intake pulsation in the intake passage during an anomalous state, in which the fresh air passage 53 is detached. In the present embodiment, the greater the negative pressure in the intake passage, the greater the determination value used for the anomaly determination is set. This reduces erroneous determinations in the anomaly determination and increases the accuracy in detecting the occurrence of an anomaly.

(4) The anomaly detection is performed during an idling operation, in which the negative pressure in the section of the intake passage downstream of the throttle valve 36 is increased, and while the vehicle is in a stopped state and the idling operating state is continued. When the negative pressure in the intake passage is great, the pulsation of the intake air caused by the blow-by gas and the fresh air is also increased. Thus, the anomaly detection is performed when the difference in the degree of the pulsation of the intake air is likely to occur between a case in which the fresh air passage 53 is in the normal state and a case in which the fresh air passage 53 is in an anomalous state and when the pulsation of the intake air is stable. This ensures the correctness of the anomaly detection of the fresh air passage 53.

In an idling operation in which the rotational speed of the internal combustion engine is low, the time taken for the crank angle to reach 720° CA is long. Thus, compared with the operation range in which the engine rotational speed is high, the number of the signals input from the air flowmeter 81 per 720° CA is increased. This increases the detection accuracy of the pulsation and increases the anomaly detection accuracy of the fresh air passage 53.

(5) The pulsation detector 61 includes the bandpass filter 61A. Thus, the pulsation detector 61 extracts, among the output signals from the air flowmeter 81, the output signal in the frequency range corresponding to the pulsation frequency generated by the flow of the blow-by gas and the fresh air. Thus, for example, the influence of noise and disturbance of the air flowmeter 81 that is irrelevant to the frequency of the intake pulsation caused by the flow of the fresh air is filtered out. This enables detection of the intake pulsation that substantially reflects the influence of the flow of the fresh air. Thus, the detection accuracy in detecting the occurrence of an anomaly in the fresh air passage 53 based on the pulsation of the intake air is improved.

(6) The bandpass filter 61A changes the frequency range to be passed in accordance with the operating state of the internal combustion engine detected by the operating state detector. The pulsation frequency of the negative pressure generated in the intake passage is changed in accordance with the operating state of the internal combustion engine. According to the present embodiment, even if the operating state of the internal combustion engine is changed, the pulsation detector 61 extracts, among the output signals from the air flowmeter 81, the output signal in the frequency range that corresponds to the pulsation frequency generated by the flow of the blow-by gas and the fresh air. Thus, even if the operating state of the internal combustion engine is changed, the intake pulsation that substantially reflects the influence of the flow of the fresh air is detected. This further improves the detection accuracy in detecting the occurrence of an anomaly in the fresh air passage 53 based on the pulsation of the intake air.

(7) The anomaly detector 63 determines an anomaly of the fresh air passage 53 depending on whether the ratio R of the number of times the fresh air passage 53 is tentatively determined to be anomalous relative to the number of times that the anomaly detection control is executed is greater than or equal to the anomalous ratio. This configuration eliminates the influence when the tentative determination is made temporarily that there is an anomaly due to some factors although the fresh air passage 53 is in the normal state. This ensures the correctness of the anomaly detection of the fresh air passage 53.

(8) The air flowmeter 81 is employed as the pulsation sensor. The air flowmeter 81 is a sensor used for other controls such as control of the intake air amount in the internal combustion engine. In the present embodiment, the air flowmeter 81, which is also used for other controls, serves the function of the pulsation sensor. That is, the internal combustion engine that includes the air flowmeter 81 does not require an additional sensor for detecting the intake pulsation in the intake passage. This configuration contributes to further reducing the design change in the internal combustion engine.

The above-described embodiment may be modified as follows.

The air flowmeter 81, which detects the flow rate of the intake air, is used as the pulsation sensor. However, other sensors that detect the intake pulsation in the intake passage may be employed. Since the pressure in the intake passage is changed if intake pulsation occurs, a pressure sensor may be employed as the pulsation sensor.

The method for detecting an anomaly in the fresh air passage 53 with the anomaly detector 63 is not limited to the method based on the result of the tentative determination that is made multiple times as described above. For example, when the path length $\Sigma TL$ of the intake pulsation in the intake passage is less than or equal to the determination value, the fresh air passage 53 may be determined to be in an anomalous state. That is, although the anomaly determination may be made taking into consideration of the comparison results between the path length $\Sigma TL$ and the determination value for multiple times like the above embodiment, the anomaly determination may be made based on the comparison result between the path length $\Sigma TL$ and the determination value for one time. In this case, compared with the above embodiment, the time required for completing the anomaly detection is shortened.

The control device for an internal combustion engine that executes the cylinder deactivation control has been described as an example. However, the same configuration as the above embodiment may be applied to a control device for an internal combustion engine that does not execute the cylinder deactivation control. In this case, the bandpass filter 61A may variably set the frequency range of the output signal to be passed among the output signals of the air flowmeter 81 in accordance with only the rotational speed of the internal combustion engine.

The bandpass filter 61A does not necessarily have to include the function to vary the frequency range of the output signal to be passed among the output signals of the air flowmeter 81. In this case, for example, the pulsation detector 61 includes bandpass filters that allow output signals in different frequency ranges to be passed. When the operating state of the internal combustion engine is changed, the pulsation detector 61 selects, among the bandpass filters, the bandpass filter that passes the signal in the frequency range that includes the pulsation frequency of the negative pressure generated in the intake passage and processes the output signals from the air flowmeter 81 with the selected bandpass filter to detect the intake pulsation in the intake passage. With this configuration also, the same operational advantage as the above-mentioned advantage (6) is achieved. The pulsation detector 61 may include only one bandpass filter that passes the signal in a predetermined frequency range.

The pulsation detector 61 does not necessarily have to include the bandpass filter 61A. In this case, the intake pulsation of the intake passage is detected without processing the output signals from the air flowmeter 81 with the bandpass filter 61A.

The control device 60 for the internal combustion engine starts the anomaly detection control when the operating state of the internal combustion engine is an idling operation and the vehicle is in a stopped state. However, these requirements may be changed as required. For example, even if the vehicle is in the traveling state, the anomaly detection control may be executed as long as the operating state of the internal combustion engine is an idling operation. The anomaly detection control may be executed when the PCV device 50 is operated regardless of the operating state of the internal combustion engine and the condition of the vehicle. In this case, in the flowchart of FIG. 2, the process in step S201 may be omitted.

The manner in which the determination value is calculated by the determination value calculator 64 is not limited to the above-described manner. For example, the determination value may be set to be variable in accordance with only one of the rotational speed of the internal combustion engine and the negative pressure in the intake passage. The determination value may be a fixed value. In these cases, the determination value may be set to be less than the path length $\Sigma TL$ of the intake pulsation in the intake passage when the fresh air passage 53 is in the normal state and greater than the path length $\Sigma TL$ of the intake pulsation in the intake passage when the fresh air passage 53 is in an anomalous state. The determination value is set based on, for example, a value obtained by experiments.

If it is determined that an anomaly has occurred in the fresh air passage 53, the anomaly detector 63 stores the decision outcome. Instead of or in addition to such a configuration, an alarm lamp may be provided at the driver's seat of the vehicle. If an anomaly in the fresh air passage 53 is detected, the anomaly detector 63 may turn on the alarm lamp so that a driver or an operator is informed of the anomaly without access to the control device 60.

The PCV valve 52 is a mechanical valve that opens and closes in accordance with the pressure in the section of the PCV passage 51 near the crank chamber 18 and the pressure in the section of the PCV passage 51 near the intake manifold 30. However, other configurations such as an electric valve or an electromagnetic valve may be employed. In this case, the generation amount of the blow-by gas may be calculated in accordance with the operating state of the internal combustion engine. When the amount of the blow-by gas in the crank chamber 18 becomes greater than or equal to a predetermined amount, it may be determined that the execution requirement of the PCV device 50 is satisfied, and the PCV valve may be opened.

The path length calculator 62 calculates the path length ΣTL per 720° CA. However, the manner in which the path length ΣTL is calculated may be changed as required. For example, the path length ΣTL per 360° CA, which reflects the influence of two cylinders 11A, may be calculated, or the path length ΣTL per 180° CA, which reflects the influence of one cylinder 11A, may be calculated.

The parameter that is correlated with the degree of the pulsation of the intake air is not limited to the path length ΣTL of the detected intake pulsation. For example, the greater the intake pulsation, the greater become the value of the amplitude of the pulsation of the intake air and the mean of the amplitude like the path length ΣTL. Thus, the parameter calculator may calculate the amplitude of the intake pulsation or the mean of the amplitude as the parameter. When the amplitude of the intake pulsation is calculated, for example, the difference between the maximum amplitude and the minimum amplitude of the intake pulsations during 720° CA of crankshaft rotation may be used. In a case with four cylinders, the difference between the maximum amplitude and the minimum amplitude of the intake pulsations during 180° CA of crankshaft rotation, which reflect the pulsation corresponding to one cylinder, may be used. In this case also, like the above embodiment, the determination value calculator 64 may variably set the determination value in accordance with the rotational speed of the internal combustion engine or the number of the cylinders 11A being operated.

The second end of the fresh air passage 53 is coupled to the cylinder head cover 26 of the engine main body 10. However, any configuration may be employed as long as the fresh air is allowed to flow from the intake passage to the crank chamber 18 through the fresh air passage 53. For example, the fresh air passage 53 may be coupled to other sections of the engine main body 10 such as the crankcase 16.

The second end of the PCV passage 51 is coupled to the surge tank 32. However, the position at which the PCV passage 51 is coupled to the intake passage may be changed as long as the PCV passage 51 is coupled to a section of the intake passage downstream of the throttle valve 36. For example, the second end of the PCV passage 51 may be coupled to the downstream section 31 or the upstream section 33 of the intake manifold 30 or may be coupled to the section of the intake pipe 35 downstream of the throttle valve 36.

The control device for the internal combustion engine is applied to the inline four-cylinder internal combustion engine. However, the control device may be employed in an inline six-cylinder internal combustion engine, a V-type internal combustion engine, or an internal combustion engine with a forced-induction device in which a compressor of the forced-induction device is located in the intake passage downstream of the throttle valve 36. In the case of the internal combustion engine with the forced-induction device, the second end of the PCV passage 51 is coupled to the section of the intake passage downstream of the compressor in some cases. With this configuration, if an electric PCV valve is located in the PCV passage 51, there may be a case in which the PCV valve is opened while the forced-induction device is driven. Thus, the intake air forced by the compressor by the activation of the forced-induction device may flow into the crank chamber 18 through the PCV passage 51. In this case, if the coupling port between the fresh air passage 53 and the intake passage is great, gas is likely to flow back from the crank chamber 18 to the intake passage through the fresh air passage 53. In the present embodiment, the size of the coupling port between the fresh air passage 53 and the intake passage does not need to be increased to detect an anomaly in the fresh air passage 53. Thus, gas is unlikely to flow from the crank chamber 18 to the intake passage through the fresh air passage 53. Thus, when the present invention is applied to the internal combustion engine with the forced-induction device, gas is prevented from flowing back through the PCV passage 51 and the fresh air passage 53 due to the flow of the intake air forced by the compressor into the crank chamber 18.

The invention claimed is:
1. A control device for an internal combustion engine, the internal combustion engine including:
   an engine main body;
   a PCV passage including a first end coupled to the engine main body and a second end coupled to a section of an intake passage downstream of a throttle valve, wherein the PCV passage causes blow-by gas to flow from a crank chamber of the engine main body to the intake passage by negative pressure in the intake passage;
   a fresh air passage including a first end coupled to a section of the intake passage upstream of the throttle valve and a second end coupled to the engine main body, wherein the fresh air passage causes fresh air to flow from the intake passage to the crank chamber in accordance with the flow of the blow-by gas; and
   a pulsation sensor located in the intake passage upstream of the throttle valve,
   the control device comprising:
      a pulsation detector, which detects pulsation of intake air flowing through the intake passage based on output signals from the pulsation sensor;
      a parameter calculator, which calculates a parameter that is correlated with the degree of the pulsation based on the pulsation of the intake air detected by the pulsation detector; and
      an anomaly detector, which determines that the fresh air passage is detached when the parameter calculated by the parameter calculator is less than or equal to a determination value, thereby detecting an anomaly in the fresh air passage.

2. The control device for an internal combustion engine according to claim 1, further comprising an operating state detector, which detects an operating state of the internal combustion engine, wherein
- the anomaly detector includes a determination value calculator, which calculates the determination value, and
- the determination value calculator increases the determination value as a rotational speed of the internal combustion engine detected by the operating condition detector is decreased.

3. The control device for an internal combustion engine according to claim 1, further comprising a negative pressure detector, which detects negative pressure in a section of the intake passage downstream of the throttle valve, wherein
- the anomaly detector includes a determination value calculator, which calculates the determination value, and
- the determination value calculator increases the determination value as the negative pressure in the intake passage detected by the negative pressure detector is increased.

4. The control device for an internal combustion engine according to claim 1, further comprising:
- an operating state detector, which detects an operating state of the internal combustion engine; and
- a traveling state detector, which detects a traveling state of the vehicle,
- wherein, when the operating state of the internal combustion engine detected by the operating state detector is an idling operation and the traveling state of the vehicle detected by the traveling state detector is a stopped state, the anomaly detector starts detection of an anomaly.

5. The control device for an internal combustion engine according to claim 1, wherein the pulsation detector includes a bandpass filter that passes, among output signals from the pulsation sensor, an output signal in a frequency range that corresponds to a pulsation of the negative pressure generated in a section of the intake passage downstream of the throttle valve.

6. The control device for an internal combustion engine according to claim 5, further comprising an operating state detector, which detects an operating state of the internal combustion engine,
- wherein the bandpass filter changes the frequency range of the output signal to be passed among the output signals in accordance with the operating state of the internal combustion engine detected by the operating state detector.

* * * * *